United States Patent [19]
Blount et al.

[11] Patent Number: 5,875,479
[45] Date of Patent: Feb. 23, 1999

[54] METHOD AND MEANS FOR MAKING A DUAL VOLUME LEVEL COPY IN A DASD STORAGE SUBSYSTEM SUBJECT TO UPDATING DURING THE COPY INTERVAL

[75] Inventors: Lawrence Carter Blount; Carol Santich Michod, both of Tucson, Ariz.

[73] Assignee: International Business Machines Corporation, Armonk, N.Y.

[21] Appl. No.: 779,577

[22] Filed: Jan. 7, 1997

[51] Int. Cl.⁶ .................................................. G06F 12/16
[52] U.S. Cl. ...................... 711/162; 711/112; 395/182.04
[58] Field of Search .................... 711/162, 161, 711/112, 111; 395/182.03, 182.04, 182.05, 182.06

[56] References Cited

U.S. PATENT DOCUMENTS

| | | | |
|---|---|---|---|
| 3,725,864 | 4/1973 | Clark et al. | 395/826 |
| 4,207,609 | 6/1980 | Luiz et al. | 395/858 |
| 4,872,106 | 10/1989 | Slater | 395/182.11 |
| 5,241,668 | 8/1993 | Eastridge et al. | 395/182.03 |
| 5,241,670 | 8/1993 | Eastridge et al. | 395/180 |
| 5,319,766 | 6/1994 | Thauer et al. | 711/146 |
| 5,446,871 | 8/1995 | Shomler et al. | 395/180 |
| 5,701,429 | 12/1997 | Legvold et al. | 711/114 |

OTHER PUBLICATIONS

Mikkelsen, "Method and Means for Time–zero Backup and Copying of Data", Application Serial No. 07/781,044, filed Oct. 18, 1991, now abandoned.

*Primary Examiner*—Tod R. Swann
*Assistant Examiner*—J. Peikari
*Attorney, Agent, or Firm*—R. Bruce Brodie; Robert M. Sullivan

[57] ABSTRACT

A volume-to-volume copy method on a DASD storage subsystem concurrent with host CPU application execution and referencing of data on a primary. In this method, updates to data made on a primary volume after the element was copied during a first pass will be deferred and copied only during a second pass rather than interrupting the first pass. This accumulation and deferral of updates to a second pass shortens the volume copy time and reduces application referencing delay.

10 Claims, 4 Drawing Sheets

ONE AND A HALF PASSES

| TYPE OF I/O | 3990 SCU MOD. 6 METHOD | ONE PASS AND A HALF | DIFFERENCE |
|---|---|---|---|
| WRITES TO SAME RECORD<br>    4 WRITES TO PRIMARY<br>    SECONDARY | 4 * 20<br>4 * 25 | 4 * 20<br>— | 4 * 25 |
| FOR EACH WRITE OP THERE EXISTS A READ OP:<br>    I. E. 4 READ OPS | 4 * 10 | 4 * 10 | |
| FOR EACH READ/WRITE PAIR THERE EXISTS 1 COPY I/O<br>    I. E. 4 COPIES | 4 * 35 | 4 * 35 | |
| WRITES TO ANOTHER RECORD<br>    1 PRIMARY WRITE<br>    1 SECONDARY WRITE | 1 * 20(A)<br>1 * 25 | 1 * 20<br>— | 1 * 25 |
| FOR EACH WRITE OP THERE EXISTS A READ OP:<br>    I. E. 1 READ | 1 * 10 | 1 * 10 | |
| FOR EACH READ/WRITE PAIR THERE EXISTS 1 COPY I/O<br>    I. E. 1 COPY | 1 * 35 | 1 * 35 | |
| FOR WRITES TO AREAS <u>NOT</u> COPIED<br>    I. E. 5 WRITES PRIMARY ONLY | 5 * 20 | 5 * 20 | |
| FOR EACH WRITE OP THERE EXISTS A READ OP<br>    I. E. 5 READS | 5 * 10 | 5 * 10 | |
| FOR EACH READ/WRITE PAIR THERE EXISTS 1 COPY I/O<br>    I. E. 5 COPIES | 5 * 35 | 5 * 35 | |
| PASS AND A HALF MAKES COPIES FROM THE UPDATE WRITES MADE DURING THE FIRST PASS<br>    I. E. COPIES FROM UPDATES | | 2 * 25(B) | 2 * 25 |

SIMULATION OF ONE AND A HALF PASSES IN THE PEER TO PEER VOLUME COPY CONTEXT

*FIG. 4*

METHOD AND MEANS FOR MAKING A DUAL VOLUME LEVEL COPY IN A DASD STORAGE SUBSYSTEM SUBJECT TO UPDATING DURING THE COPY INTERVAL

FIELD OF THE INVENTION

This invention relates to backup copy and recovery of data in a disk storage subsystem and, more particularly, to tuning the backup copying during volume duplexing or mirroring concurrent with host updating thereof.

DESCRIPTION OF RELATED ART

A data processing system must be prepared to recover, not only from corruptions of stored data such as noise bursts, software bugs, media defects, and write path errors, but from global events such as a CPU power failure. The most common technique to ensure continued availability of data is to make one or more copies of CPU datasets and put them in a safe place.

Logical Aspects of a Host and DASD Storage Subsystem— IBM 3990/3390 Storage Subsystem When data is to be transferred to or from an IBM 3990/3390 external storage subsystem, an MVS host (S/390) invokes an access method for forming an encapsulated message including the storage action desired, storage location, and data object and descriptor, if any. This "message" is turned over to a virtual processor (denominated a logical channel). The function of the logical channel is to send the message to the storage subsystem over a physical path connection termed a "physical channel". The storage subsystem, in turn, interprets the commands by first establishing a path to the designated storage device and passing the interpreted/accessing commands and data object to the storage device location on a real-time or deferred basis. The sequence of commands are denominated "channel command words" (CCWs). Note, the storage device may be either "logical" or "real". If the device is "logical", then device logic at the interface will map the access commands and the data object into a form consistent with the arrangement of real devices forming the "logical" device.

The "access method" portion of the MVS operating system, when processing data objects in the form of variable-length ECKD records, will also ascertain either a "new address" or an old (update in place) address. The access method assumes that external storage includes actual physical DASDs, devices, etc. It generates addresses on a DASD device, cylinder, head, and record (CCHHRR) basis. Parenthetically, ECKD is an acronym for a modification of IBM Count, Key, Data architecture for formatting variable-length records, principally by the use of the DEFINE EXTENT command which avoided having to invoke a START I/O command at the host with the host CPU attendant overhead.

Significantly, the data objects are ordinarily aggregated on a 3380/3390 DASD track basis. That is, when an application requests one or more records, the access method determines what would be an efficient unit of staging, i.e., record staging or track staging between the S/390 and the 3990 SCU. Accordingly, the access method modifies the CCW chain and address extent occasionally from a track to a record. Originally, an access method comprised a set of protocols for moving data between a host main memory and physical input/output devices. However, today it is merely a mapping to a logical view of storage, some of which may be physical storage. If the mapping is to logical storage, then a further mapping is required to define the data locations onto a physical device.

The logical channel, in turn, will cause a string of CCWs, together with "track-formatted data, to be destaged to a 3990 storage control unit (SCU). An IBM 3990 Storage Control Unit (SCU) "interprets" the CCWs and batches the writes in a nonvolatile store (NV write buffer) for later destaging to one or more 3390 logical or physical DASDs. That is, establishing a read path results in data being staged up to a large cache from DASD, while establishing a write path results in data being written into a failure-independent NV buffer and destaged to DASD at a later time.

The IBM 3990 SCU Model 6 utilizes a large cache (up to 4 gigabytes) in which the data is staged and destaged in the form of 3380/3390 DASD tracks. This devolves whether the staging of data occurs between a plurality of logical or real 3390 DASDs and the 3990 cache, or the destaging of data between the NV write buffer and the logical or real 3390 DASDs.

Aspects of Storage Organization

A dataset is a major unit of storage and retrieval comprising collections of data in one of several prescribed arrangements and characterized by control information (dataset descriptor) to which the system has access.

A volume refers to a unit of storage accessible to a single read/write mechanism. A volume table of contents (VTOC) is a table on a direct access volume that describes each dataset on the volume. There is a distinction to be made between dataset level copying and volume level copying; namely, that a volume is a more global unit of storage than a dataset and constitutes the contents of a single device, etc.

Aspects of Applications and Backup Copies

Applications (software programs) are executed on CPUs in either a batch (streamed) or interactive (transactional) mode. In batch mode, usually one application at a time executes without interruption. In interactive mode, several applications are executing concurrently on an interrupt-driven basis.

It is to be appreciated that backup policies are policies of scheduling. They have a space and a time dimension. The space dimension is expressed as a range of datasets, and the time is the scheduled or opportunistic occurrence of the backup. A full backup involves copying the entire range, whether updated or not. An incremental backup copies only that portion of a dataset that has changed since the last backup (either full or incremental). Thus, a backup copy represents a consistent view of the data as of the time the copy or snapshot was made.

When and at what level should a backup copy be made? There is no single answer. In the period between 1955 to 1980, backup on large computing facilities, such as the IBM S/360 and S/370, was performed by halting all applications and batch copying all of the day's or week's transactions. The system would be down from a productivity point of view for hours or days. In addition to the cost of delay, there was the difficulty of reestablishing the information state of those applications in transit just prior to termination for backup recording.

Even assuming that a complete backup has been made of the information state of a host and its attached storage subsystem, what is the fault tolerance and availability strategy? That is, at what level should backups and duplicate copies of data be made, and when and what elements should be involved in the recovery? Such copying undoubtedly should occur on a scheduled or opportunistic basis, such as where it is anticipated that a logical or physical device might fail and where copying primary volumes onto a failure-independent or other device. This is termed "hot sparing" in the prior art.

It is also well appreciated in the prior art that a large information handling system managing several levels of hierarchically-organized storage would utilize several copy functions. This is exemplified by the IBM S/390 CPU running under MVS/DFSMS and attaching a 3990/3390 DASD storage subsystem. These functions are summarized in the following table:

| Copy Type | System Level and Function |
| --- | --- |
| Concurrent Copying | Host-level (S/390) mapping and data movement wherein the data to be copied is mapped onto the backup copy medium by movement through the host. It uses side files for buffering any updates to data not yet copied. However, updates to data sets already copied can be concurrently written through to external DASD storage (3390s). See Mikkelsen, application Serial No. 07/781,044, "Method and Means for the Time-Zero Backup Copying of Data", filed October 18, 1991, now abandoned; Eastridge et al., U.S. Pat. No. 5,241,670, "Method and System for Automated Backup Copy Ordering in a Time Zero Backup Copy Session", issued August 31, 1993. |
| Extended Remote Copy (XRC) | Host-level mapping in which data is duplexed asynchronously at a distant location from copies based at a primary storage subsystem. The copying is nondisruptive to applications executing on a host. Any data loss is accounted for at the remote site using a token and unique sequence number responsive to each write operation at the primary site. The method relies upon the sequence number to establish a sequence, and thereby define gaps in order to ascertain missing updates. See Shomler et al., U.S. Pat. No. 5,446,871, "Method and Arrangement for Multi-system Remote Data Duplexing and Recovery", issued August 29, 1995. |
| Dual Copy | IBM 3990 SCU level data mirrored on a pair of DASDs, each of which is in a separate IBM 3990/RAMAC drawer. |
| Peer-to-Peer Remote Copy (PPRC) | A volume copy operation wherein a volume stored on a 3390 physical or logical DASD and attached to a first IBM 3990 SCU is copied onto another failure-independent physical or logical DASD attached to a second IBM 3990 over a direct physical path connection (ESCON), i.e., a volume-mirrored pair of DASDs attached to failure-independent control units. |

SUMMARY OF THE INVENTION

It is an object of this invention to devise a volume-to-volume copying method and means subject to updating during the copy interval in a storage subsystem attaching a host in which host application time delay is reduced and volume-to-volume synchronicity is speeded up.

It is yet another object to effectuate such volume-to-volume copying irrespective of the random or sequential pattern of concurrently-occurring updates to the primary volume.

It is still another object to devise a method and means wherein frequently updated data objects including datasets, data descriptors such as VTOCs, or the like need only be copied twice.

The foregoing objects are believed satisfied by a method comprising the steps of:

(a) forming a list structure defining copy status and copy order of the one or more data sets and descriptors in a first volume;

(b) setting a first copy status value in the list structure to selected ones of the one or more datasets or descriptors in the first volume;

(c) copying from the first to a second volume each of the one or more datasets or descriptors in the list structure having a copy status set to the first value in the defined copy order, and setting the copy status to each copied dataset or descriptor to a second value; and (d) resetting the copy status in the list structure to the first value of any datasets or descriptors in the primary volume updated during the pendency of step (c) and already copied to the secondary volume; and repeating step (c) at least once.

Updates occurring during the first pass would have to be copied during the "half pass" in their first pass order of occurrence. Any update, or an update of an update occurring after the point of copy has passed, is not included and must be accumulated for a subsequent copy cycle. The underlying assumption is that the quantity of changed data is significantly smaller than that of the whole volume. It was decided to cut off the method after the half pass in order to provide some copy cycle of finite duration and predictability.

Often updates to data written to an external DASD storage subsystem are clustered or occur in a short period of time. This includes multiple updates to the same data, as well as single updates to different data. The method of this invention permits the updates to occur to the primary volume without having to copy them over to the secondary volume until the end or later phase of the copy process. Because the clustering occurs to data in space as well as time, the number of DASD seeks and seek distances are reduced. This reduction in the number of copy I/O to the secondary volume also reduces the loading on the supervening storage control unit. Consequently, the time to complete execution of the copy function to the secondary volume is reduced. This benefit is projected in faster execution as perceived by a host CPU and the like.

When certain recurring data structures such as VTOCs, VTOC indices, and partitioned data sets often are written near the beginning or middle of a primary volume, then the likelihood of their being multiply updated after being initially copied is high. Then, the savings in deferring the copy to the second pass are great indeed.

BRIEF DESCRIPTION OF THE DRAWING

FIG. 4 shows the results of simulations comparing the method of the invention and the previous volume copy method.

DESCRIPTION OF THE PREFERRED EMBODIMENT

Figure 1:
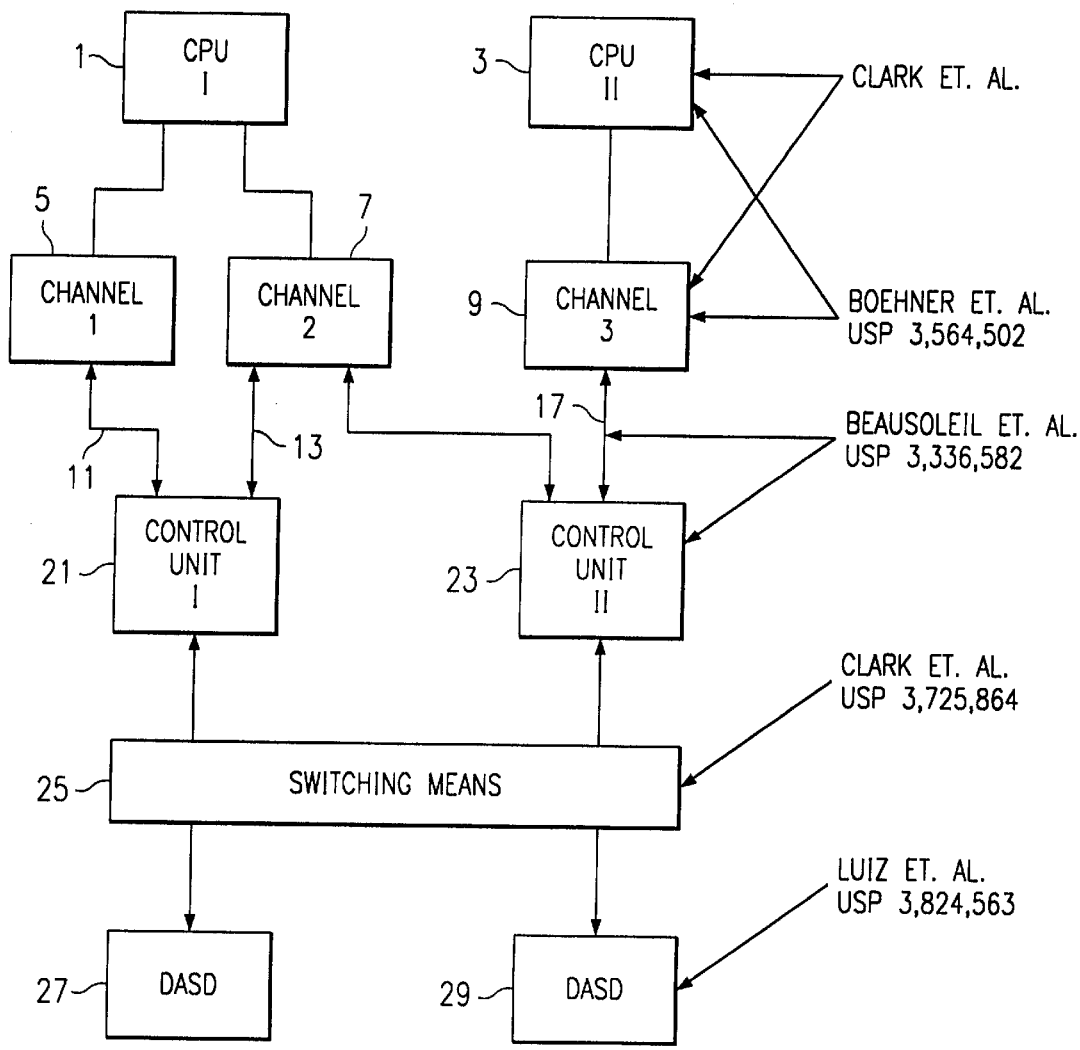
FIG. 1 discloses a pair of hosts accessing a shared external DASD storage subsystem according to the prior art.

Referring now to FIG. 1, there is shown a multiple host CPU accessing a shared DASD storage subsystem having preferably a pair of IBM 3990 control units coupling a plurality of IBM 3390 DASDs. The invention is illustratively practiced on a configuration based on the IBM S/360, S/370, and S/390 architectures utilizing the IBM MVS operating system having a Data Facility System Manager Storage (DFSMS) component. Advantageously, DFSMS can invoke and manage any of the four underlying copy functions (concurrent copy, peer-to-peer, etc.).

For purposes of completeness, an IBM S/360 architected CPU is fully described in Amdahl et al., U.S. Pat. No. 3,400,371, "Data Processing System", issued Sep. 3, 1968. A configuration of CPUs sharing access to DASD external storage is set forth in Luiz, U.S. Pat. No. 4,207,609, "Path Independent Device Reservation and Reconnection in a Multi-CPU and Shared Device Access System", issued Jun. 10, 1980. An MVS operating system is also described in IBM Publication GC28-1150. Details of standard MVS or other operating system services such as local lock management, subsystem invocation by interrupt or monitor, and the posting and waiting of tasks is omitted. These services are believed well appreciated by those skilled in the art. The operation of the DFSMS component of MVS is described in IBM publication GC26-4900, "DFSMS/MVS Version 1 Release 3" General Information Manual.

Referring again to FIG. 1, there is shown a plurality of processors 1, 3 accessing external storage subsystem 21–29 over a plurality of redundant demand/response channel interfaces 5, 7, 9 and their counterpart interfaces 11, 13, 17. One interface, interface 7, is also shown cross-coupled to control unit 23 over path 15. As described in the Luiz patent, a CPU process establishes a path to externally-stored data in an IBM S/370 and the like through MVS or other operating systems by invoking a START I/O, transferring control to a channel subsystem which reserves a path to the data over which transfers are made. Typically, applications have data dependencies and may briefly suspend operations until a fetch or an update is completed. During the transfer, the path is locked until the transfer is completed.

Figure 2:
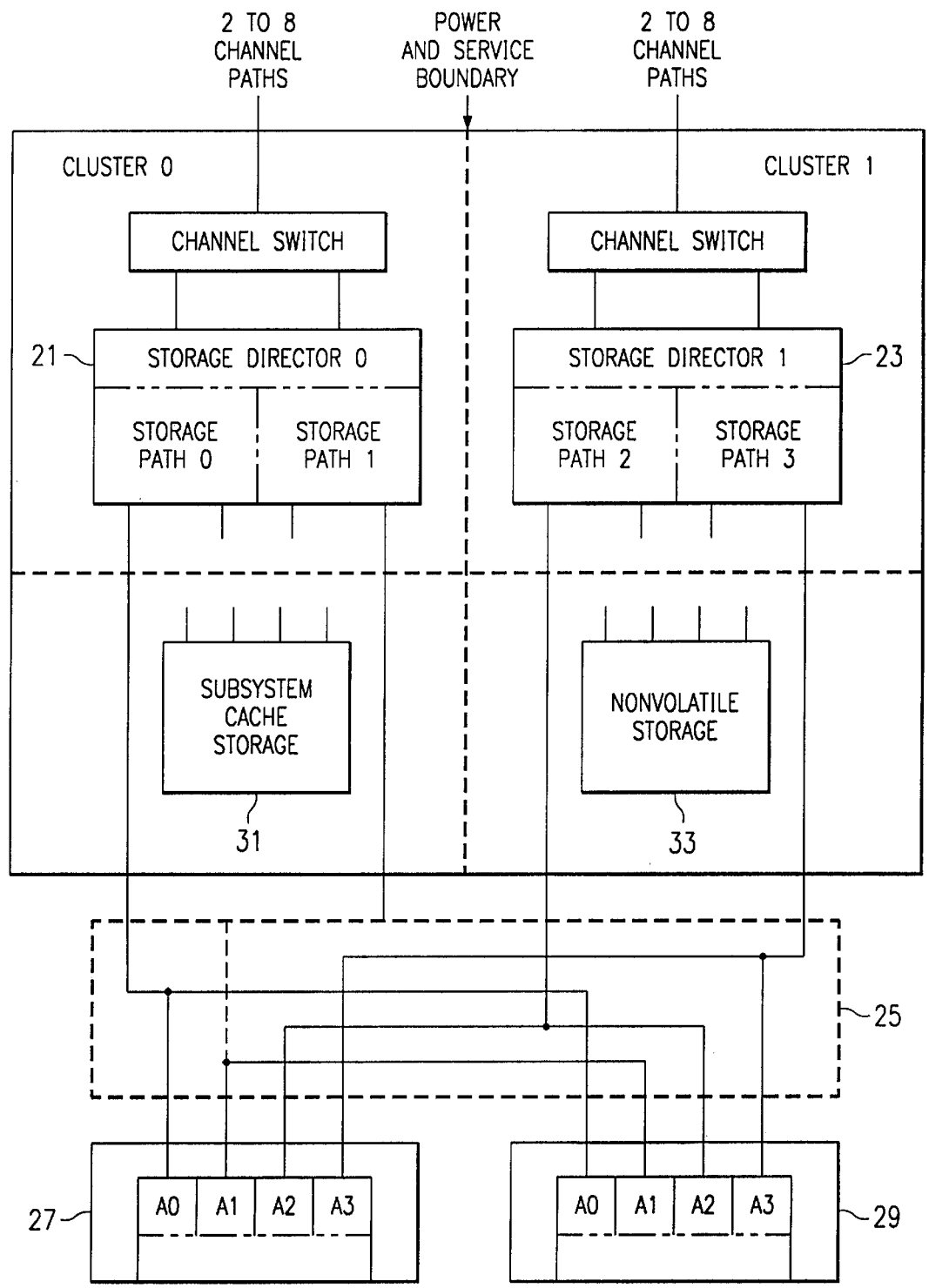
FIG. 2 sets out the configuration of FIG. 1 showing the relationship between the IBM 3990 storage control unit and a plurality of IBM 3390 logical DASDs engendered by a subsystem cache store and a nonvolatile store.

Referring now to FIG. 2, there is shown an implementation of the host/storage subsystem architecture displayed in FIG. 1. Depicted is a block diagram of the IBM 3990 Model 6 Storage Control Unit with a pair of storage control units 21 and 23, termed storage directors, contained therein. The data flow follows the same precept as shown in FIG. 1; namely, that there are two paths to the data stored on any single IBM 3390 logical or physical DASD 27A0-A3 and 29A0-A3. The paths can use a switching element 25 as described in Clark, U.S. Pat. No. 3,725,864, or by redundant physical hard-wired pathing. However, the architecture has been modified by logically separating the read and write paths through the use of subsystem cache 31 and nonvolatile store (NVS) 33.

In this regard, host CPU-originated read references are staged to the cache 31 from the DASDs 27, 29 and are aged out, such as by being overwritten in cache on a least recently used (LRU) or other basis. Host-originated write references or updates are buffered in the NVS and written out to DASDs on an opportunistic or other scheduled basis. The physical and logical read and write path separation permit independent tuning disciplines.

It would be useful to reiterate the fact that a volume refers to a unit of storage accessible to a single read/write mechanism, and that a volume is a more global unit of storage than a dataset and constitutes the contents of a single device, etc. Now, while a volume usually will store several datasets, the notion of dataset is flexible enough such that a dataset can extend over several volumes.

As implied from the discussion of the prior art, several distinctive copy functions or regimes have been devised to satisfy different information state demands in a host/external DASD storage subsystem. As may be recalled, the copy functions include Concurrent Copy, Dual Copy, Peer-to-Peer Copy, and Extended Remote Copy. Concurrent Copy is directly host managed and is used to create a snapshot of one or more DATASETs. It represents the information state of a given dataset at a point in time. It is thus useful for recovery, such as in reestablishing a point-in-time information state. The snapshot is old because it may be taken while one or more applications are concurrently modifying or updating the dataset. In contrast, the remaining copy functions are VOLUME oriented in which the duplicate volume is maintained in near synch with the primary volume such that the secondary can be a near-instant replacement should the primary volume become unavailable.

Figure 3:
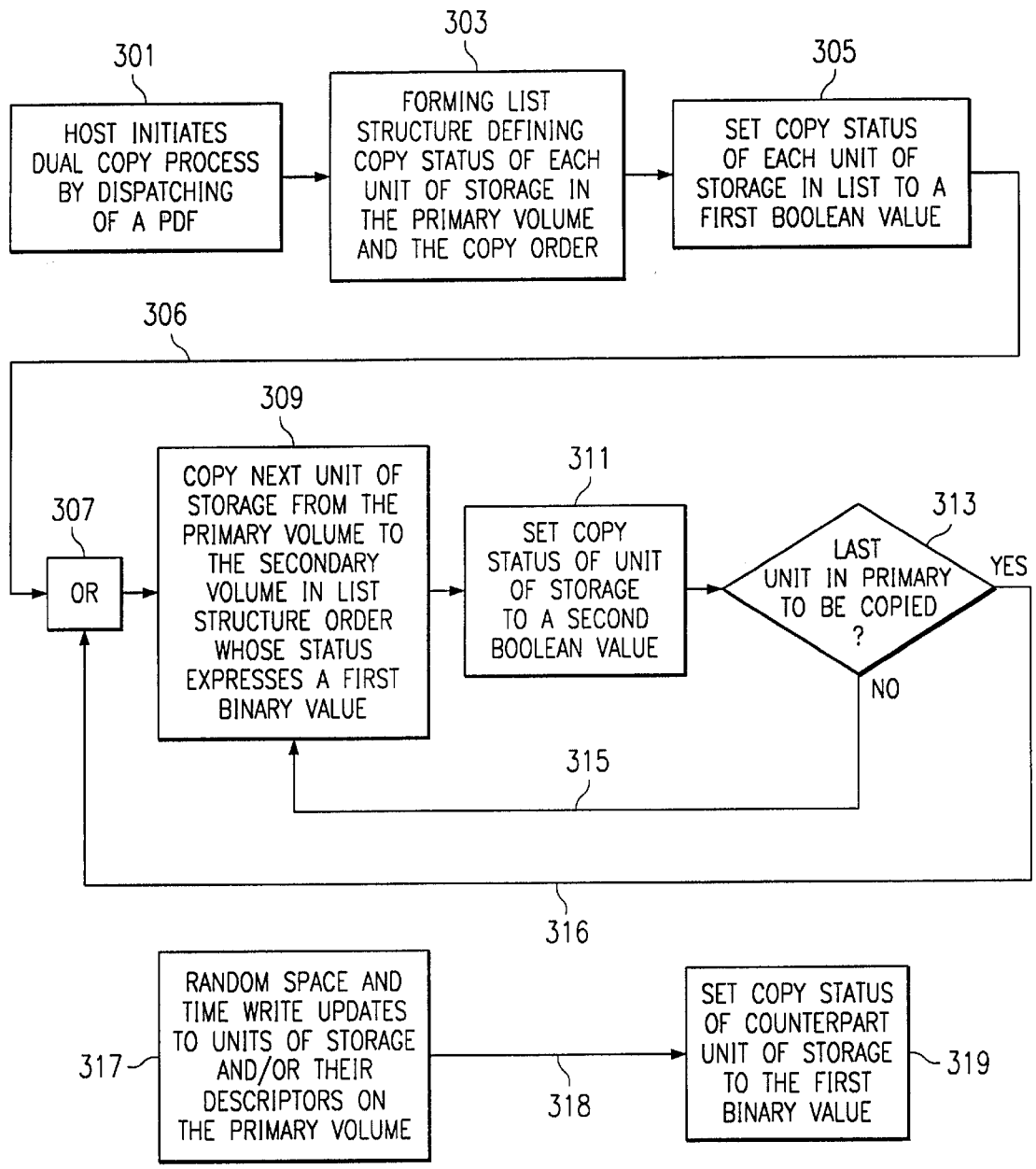
FIG. 3 depicts a flow of control at the storage control unit level for volume level duplication according to the method of the invention.

Referring now to FIG. 3, there is shown a flow of control for the method and means of this invention. The method is invoked in step 301 by a host CPU S/390 operating under MVS executing a Perform Subsystem Function (PSF) CCW. The PSF CCW includes parameters identifying primary and secondary volumes on selected first and second failure-independent logical or physical IBM 3390 DASDs. This PSF type is generated for any one of the three volume copy functions (Dual Copy, Peer-to-Peer Copy, and Extended Remote Copy). It is appreciated that other operating systems use constructs similar to a PSF CCW for the purpose of invoking parameterized subsystem operations.

The PSF CCW is communicated to the 3990 control unit 21 over a channel interface and interpreted. This means that the control unit 21 will define a secondary volume and the units of storage (such as tracks) of the primary volume to be copied. To facilitate the copy function, a list structure in step 303 is generated, while step 305 modifies the list structure by designating the tracks to be copied and their copy order. Control then passes to step 309 as shown by path 306 and logical OR 307. In this regard, the list structure is one selected from a set consisting of an array and a linked list. Preferably, the array can be expressed as a bit map in which the bit value indicates the copy status of a counterpart track.

The map position of each of the bits determines their copy order. Those tracks having bits set to a first Boolean value can be copied in an order of traverse of the bit map. This order of traverse or scanning is one selected from a set consisting of array row major order, array column major order, and array diagonal major order. Ordinarily, row major order (bit map scanned left to right and top to bottom) is used.

Referring again to FIG. 3, the copy operation includes a first pass defined by reiterative steps 309, 311, 313, and 315 in which tracks having the bits set to a one are copied in row major order. As they are copied, the counterpart status bit in the bit map is reset to zero. A pointer is used to track the progression of the copying within the pass. After a track is read from the primary volume and written to the secondary, the bit map is scanned in copy order until the next one bit is detected, the pointer incremented, and a track copy I/O executed. As implicit in step 313, if a one bit in the bit map is not detected in copy order, then it is deemed that the last track has been copied in the first pass and the method transits back over path 316 to a second pass and logical OR 307. The detection of another one bit in copy order results in a return to step 309 over path 315.

During the first pass, the host may write one or more updates to tracks stored in the primary volume containing datasets or their VTOC descriptors or the like in step 317. When such updates occur, the counterpart status bit is set to a one, as in step 319. More particularly, for every update that occurs to the storage subsystem, a check is made to determine if the update lies to a dataset/track on the primary volume being copied. If it is stored at a location other than on the primary volume, it is written to the addressed volume and track.

The second pass is processed in the same manner as the first pass except that the volume copy operation is deemed complete at the conclusion of the second pass. That is, a search of the bit map is made in copy order for the next status or one bit and the counterpart track copied from the primary to the secondary volume. Concurrently, that status bit is set to zero. The process repeating to the end of the bit map is reached.

The question arises "how are updates to the primary volume which occur during the second pass processed"? The answer is that they update the primary and the bit map as before. This leads to the underlying assumption that the quantity of changed data is significantly smaller than that of the whole volume. Thus, by terminating the method after a "pass and a half", then predictability and stability would be achieved. Also, there was no evidence that more than two passes would provide a significant performance improvement in terms of reduction in delay and speedup of synchronicity, etc.

Assume that for a set of N records to be recopied from a primary to a secondary volume over time T that:

(a) x<N records will be updated in the interval 0<t<T, (b) the copy sequence follows a predetermined order and this order repeats for the second pass, and (c) the updates are distributed among the sets x and N−x where x<N is the set of records already copied by time t<T, and (N−x) is the set of records yet to be copied in the interval (T−t) copied.

Studies indicate that in any given application operated on N records, the population proportion p that is write updated or changed in a fixed interval remains constant. Thus, if in time T where N records are copied, then pN records will be updated. On the second pass, an average of p(pN) records will be changed. Even if an update population proportion of p=0.50 for successive passes n=1,2,3, . . . , then the expected number E(N) of update records occurring during subsequent passes n would still exponentially diminish since $E(N)=p^nN$.

Referring again to FIG. 4, there is shown a table summarizing a simulation using the method of this invention under a Peer-to-Peer copy function. In Peer-to-Peer copying, a write command requires that data be written to both the primary and secondary volumes in order for the host CPU to consider that the write command has been completed. In the method of this invention, during the volume establish phase first pass, the write has only to be completed to the primary volume. No other access commands (read/write) to the volume may occur until these writes are complete. In Peer-to-Peer copying, a volume is not considered Duplexed (writes kept in sync) until the establish phase is complete. This is also true of other common volume copy methods.

The simulation was executed on a system configured substantially as that shown in FIG. 2. The object of the simulation is to evidence improvement in host application response time and reduction in the elapsed time required to complete the copy function.

In the simulation, it was assumed that an update write to the primary volume would take 20 milliseconds (ms), updates to the secondary volume would take 25 ms, read commands would take 10 ms, and copy I/Os (copy of record from primary to secondary) would take 35 ms. The significant aspect is the difference in the number of secondary writes.

Referring again to FIG. 4, assume that a host CPU applies I/Os such that (a) for every host write there is a host read, and (b) for every host write/read pair there is one copy I/O. Also, assume that a copy I/O is the function of making a copy of a record on the primary and putting it on the secondary volume. In actual practice, any host I/O would slow down the number of copy I/Os that could be performed in a unit of time.

It should further be assumed that five writes are to data that has already been copied to the secondary. The other five writes are to areas not yet copied to the secondary. It should be still further assumed that four of the five writes are directed to already copied areas and are to the same record. The table in FIG. 4 depicts both the I/Os and their execution time. The following should also be noted:

(a) A write to an already copied area requires the write to primary and write to secondary using the copy method of the prior art.

(b) The method of this invention executes a write to the primary for each host I/O. At a later time, these records written must then be copied to the secondary. If a record is written many times during the initial pass of the establish phase, it only needs to be copied once on a later pass.

In this example, there are five writes that fall into this category. The first four writes are to the same record. The prior art method involves four secondary writes. In contrast, the method of the invention uses only one later write. This may turn into a copy I/O having a slightly longer execution time than that utilized by a write operation alone. There is one other write in this example that is to an area already copied. The prior art method has a secondary write. The new method also has one secondary write, but this write comes at a later time, thus not delaying the host I/O. There are then three writes less under the new method. In this case, a read follows every write.

For the five writes to areas already copied, these reads in the old method are delayed behind the write to the primary and its write to the secondary. Under the new method, the read is only delayed by the write to the primary. Thus, host I/O times will be better under the new method. It should be evident that because there are three fewer secondary I/Os, the elapsed time of the establish would also be less.

These and other extensions of the invention may be made without departing from the spirit and scope thereof as recited in the appended claims.

What is claimed is:

1. A method for duplexing volumes on an external subsystem of tracked cyclic storage devices subject to host-originated updating, a volume being a unit of storage including the elements of one or more datasets or the like and accessible to a counterpart one of the storage devices, said duplexing to be used with any host-based copy functions such as concurrent copy or extended remote copy or subsystem-based copy functions such as dual copy or peer-to-peer remote copy, comprising the steps of:

(a) forming a list structure defining copy status and copy order of the one or more data sets or descriptors in a first volume;

(b) setting a first copy status value in the list structure to selected ones of the one or more datasets or descriptors in the first volume;

(c) copying from the first to a second volume each of the one or more datasets or descriptors in the list structure having a copy status set to the first value in the defined copy order, and setting the copy status of each dataset or descriptor so copied to a second value; and (d) resetting the copy status in the list structure to the first value of any datasets or descriptors in the primary volume updated during the pendency of step (c) and already copied to the secondary volume; and repeating step (c) at least once.

2. The method according to claim 1, wherein the descriptors are selected from a set consisting of a volume table of dataset contents (VTOC) and a VTOC index, said VTOC and VTOC index being recorded in a leading position in the volume copy order.

3. The method according to claim 1, wherein the order of step execution for duplexing the first volume onto the second volume is a minimal sequence of step (c), step (d), and step (c).

4. The method according to claim 1, wherein the number of updates in successive copy intervals as expressed in an unbounded repeated step sequence step (c), step (d), step (c) . . . is asymptotic toward zero.

5. The method according to claim 1, wherein the list structure is one selected from a set consisting of an array and a linked list, and further wherein the array is expressed as a bit map, each bit and map location being indicative of the copy status of a counterpart dataset or descriptor stored in the first volume, and still further wherein the bit map copy order of the one or more datasets or descriptors is one selected from a set consisting of row major order, column major order, and diagonal major order.

6. A system having a plurality of failure-independent tracked cyclic storage devices and at least a first control unit for establishing a write path to data stored on selective ones of the devices, said controller being responsive to an external command including parameters for duplexing a primary volume onto a secondary volume, a volume being a unit of storage accessible to a counterpart one of the storage devices, comprising at the first control unit:

means responsive to the command parameters for building a list structure representative of the copy status of the contents of the primary volume and for setting the status of preselected contents thereof to a first value;

means for copying in a first pass the preselected contents from the primary to the secondary volume in list structure order, for setting the status of the contents as they are copied to a second value, and for setting the status of those contents already copied to the secondary volume and again updated during the first pass to the first value; and means for copying in a second pass only those contents of the primary to the secondary volume in list structure order having a counterpart status set to the first value.

7. The system according to claim 6, wherein the list structure is one selected from a set consisting of a bit map and a linked list, said list structure order for a bit map being one selected from a set consisting of row major order, column major order, and diagonal major order.

8. The system according to claim 6, wherein the contents of the primary volume include at least one dataset and a volume table of dataset contents (VTOC), said VTOC being recorded in a leading position in the primary volume and in list structure order.

9. The system according to claim 6, wherein said system further includes:

a second plurality of tracked cyclic storage devices;

a second control unit for establishing a write path to selective ones of the second plurality of storage devices;

a path communicatively coupling said control units;

means at the first control unit for ascertaining fault tolerance of the first plurality of devices; and means responsive to predetermined states being ascertained at one or more devices for volume copying the contents of said ascertained devices in the first plurality to counterpart devices in the second plurality over a traverse including the first control unit, the path, and the second control unit.

10. An article of manufacture comprising a machine-readable memory having stored therein a plurality of processor-executable control program steps for duplexing volumes on an external subsystem of tracked cyclic storage devices subject to host-originated updating, a volume being a unit of storage including the elements of one or more datasets or the like and accessible to a counterpart one of the storage devices, said duplexing to be used with any host-based copy functions such as concurrent copy or extended remote copy or subsystem-based copy functions such as dual copy or peer-to-peer remote copy, said plurality of stored, processor-executable control program steps include:

(a) a control program step for forming a list structure defining copy status and copy order of the one or more data sets or descriptors in a first volume;

(b) a control program step for setting a first copy status value in the list structure to selected ones of the one or more datasets or descriptors in the first volume;

(c) a control program step for copying from the first to a second volume each of the one or more datasets or descriptors in the list structure having a copy status set to the first value in the defined copy order, and setting the copy status to each copied dataset or descriptor to a second value; and (d) a control program step for resetting the copy status in the list structure to the first value of any datasets or descriptors in the primary volume updated during the pendency of step (c) and already copied to the secondary volume; and for repeating step (c) at least once.

* * * * *